United States Patent [19]

Dinkins

[11] Patent Number: 5,388,101
[45] Date of Patent: Feb. 7, 1995

[54] INTERACTIVE NATIONWIDE DATA SERVICE COMMUNICATION SYSTEM FOR STATIONARY AND MOBILE BATTERY OPERATED SUBSCRIBER UNITS

[75] Inventor: Gilbert M. Dinkins, Herdon, Va.
[73] Assignee: Eon Corporation, Reston, Va.
[21] Appl. No.: 966,414
[22] Filed: Oct. 26, 1992
[51] Int. Cl.⁶ .......................... H04B 7/185; H04N 7/14
[52] U.S. Cl. ................................. 370/95.1; 370/97; 348/8; 348/12; 348/13; 455/33.1; 455/53.1
[58] Field of Search ..................... 358/86; 465/5.1, 6.1, 465/6.3, 3.2, 33.1, 53.1; 320/71, 73, 75, 85.1, 95.1, 95.3, 104.1; 379/90, 93, 58, 59, 63; 348/6, 8, 12, 7, 10, 13; 370/97; 455/54.1, 56.1

[56] References Cited

U.S. PATENT DOCUMENTS

| | | | |
|---|---|---|---|
| 4,481,670 | 11/1984 | Freeburg | 455/33.3 |
| 4,525,861 | 6/1985 | Freeburg | 455/33.3 |
| 4,550,443 | 10/1985 | Freeburg | 455/33.3 |
| 4,591,906 | 5/1986 | Morales-Garza et al. | 358/84 |
| 4,755,871 | 7/1988 | Morales-Garza et al. | 358/84 |
| 4,870,410 | 9/1989 | Andros et al. | 340/825.02 |
| 4,875,039 | 10/1989 | Andros et al. | 340/825.44 |
| 5,036,389 | 6/1991 | Morales | 455/5.1 |
| 5,101,267 | 3/1992 | Morales-Garza | 455/5.1 |
| 5,177,604 | 1/1993 | Martinez | 358/86 |

*Primary Examiner*—Wellington Chin
*Attorney, Agent, or Firm*—Patrick T. King

[57] ABSTRACT

In a two-way interactive communication video network having a network switching center for point-to-point communications between subscribers at different geographic locations, a local base station configuration is provided for facilitating low power battery operated portable subscriber units. The local subscriber units surrounding a base station are adapted for multiplex transmission of digital messages synchronously related to a broadcast television signal for system coordination. Digital messages are transmitted from the local subscriber units to the base station data processing facility through a set of receive only cell site subdivision zones distributed over the base station transmitter geographical range, which communicate with the base station data processing facility over a communication link such as wired cable. Messages are compiled and relayed by satellite to a network switching center transmitter site for nationwide point-to-point communications. Small-size, inexpensive, low-power, portable, digital-transmitting subscriber units are introduced compatible with interactive video data system standards with the ability to cross subdivision and cell zones. Thus, monitoring of inventory, temperature, and other parameters for passive automatic alarm systems and the like, as well as active mobility of subscriber units for meter reading and the like is made possible with direct low-cost nationwide real time reporting capability.

20 Claims, 7 Drawing Sheets

| | SYSTEM A | | SYSTEM B |
|---|---|---|---|
| 1 | 218.03125 MHz | 16 | 218.53125 MHz |
| 2 | 218.0625 | 17 | 218.5625 |
| 3 | 218.09375 | 18 | 218.59375 |
| 4 | 218.125 | 19 | 218.625 |
| 5 | 218.15625 | 20 | 218.65625 |
| 6 | 218.1875 | 21 | 218.6875 |
| 7 | 218.21875 | 22 | 218.75875 |
| 8 | 218.25 | 23 | 218.75 |
| 9 | 218.28125 | 24 | 218.78125 |
| 10 | 218.3125 | 25 | 218.8125 |
| 11 | 218.34375 | 26 | 218.84375 |
| 12 | 218.375 | 27 | 218.875 |
| 13 | 218.40625 | 28 | 218.90625 |
| 14 | 218.4375 | 29 | 218.9375 |
| 15 | 218.46875 | 30 | 218.96875 |

INTERACTIVE NATIONWIDE DATA SERVICE COMMUNICATION SYSTEM FOR STATIONARY AND MOBILE BATTERY OPERATED SUBSCRIBER UNITS

TECHNICAL FIELD:

This invention relates to an interactive two-way data service network for conveying synchronously timed digital messages point to point throughout the network, and more particularly it relates to local area base station cell sites subdivided into zones for processing communications within the zones from subsets of subscriber units of a configuration for integrating communications into a nationwide network of interconnected base station cell sites for point to point communications with identified remote subscriber units, wherein the subscriber units comprise low energy, stationary and mobile, digital transceivers, which may be battery operated.

BACKGROUND ART

A wireless interactive video system disclosed in U.S. Pat. No. 4,591,906, May 27, 1986, Fernando Morales-Garza, et al. provides for real time interactive digital communication from a large audience of subscribers in urban areas in the vicinity of a central television transmitting station.

The Federal Communications Commission (FCC) has now established in the U.S.A. communication standards for such interactive video data service allocating wireless transmissions in the 218–219 MHz band for FCC licensing for public use in assigned local base station areas authorizing low power subscriber interaction units of maximum effective radiated power under twenty watts.

There has been no known interactive video data service system available heretofore that has the capability of servicing an assigned base station area with subscriber units transmitting in a milliwatt power range. With such an improved system, battery powered, portable subscriber units, suitable for such functions as meter reading, would become feasible with low battery drain, permitting interactive digital communication in local areas or nationwide.

Wireless interactive video data service is provided without telephone lines or cable systems over a nationwide network of base stations in the manner disclosed in U.S. Pat. No. 5,101,267, Mar. 31, 1992, Fernando Morales, by way of satellite transmissions between local area base stations and a data center.

This nationwide communication capability permits live video programs viewed nationwide, such as world series baseball games, to become interactive for individual subscriber participation. Thus, mass communications over a substantially real time communication system with such large urban area audience participation that would jam any existing public telephone switching network capability are made feasible.

Each local base station in such a nationwide communication system must be capable of interacting within designated license restrictions in the presence of peak local audience participation without significant switching delays to establish substantially real time interactive two-way connections over a network processing an audience of very large numbers of participants wishing to communicate substantially simultaneously.

Prior art two-way radio transmission network technology, as represented for example by portable telephone communication systems, is generally incompatible with efficient substantially real time communication in the presence of heavy subscriber activity. This occurs because in telephone systems switching and connection operations must be made compatible with switching instructions from subscriber instruments with coded audio tones at audio frequencies accompanying analog audio messages. Thus with long numeric identification numbers for nationwide long distance connections, typically of ten decimal digits, which must be manually entered while busying lines to complete point-to-point connections as a part of the interconnecting signal data, switching circuits are engaged for very long periods of time inconsistent with substantially real time connections or heavy traffic conditions. Accordingly busy signals are encountered often to restrict the size of a participating audience for immediate connection and the follow-up contention for a line requiring re-dialing is frustrating to the potential using audience. Thus, interactive response that requires telephone exchange communications tends to be delayed and discouraging to participants, and introduces the critical problem of identifying and communicating interactively between subscribers in real time without jammed exchanges and the frustration of encountering busy signals and starting over with a new attempt to communicate.

Similarly, even with the restricted amount of digital data that might be transferred in digital paging system messages, where typically some messages only indicate a short fixed length message such as a calling telephone number, there is little possibility of approaching real time communications in the presence of heavy traffic because of the complexities of the necessary telephone switching networks employed for conveying messages.

In order to process digital information accurately, efficiently and privately it is necessary to precisely time and organize the digital data and accompanying commands. For real time two-way digital communications with large audiences wanting prompt access to the message conveyance system or network, synchronous signal timing becomes critical and absolutely necessary for real time interactive communication. In general audio telephone communications are of an analog nature not critical to timing and are conveyed asynchronously. Thus, prior telephone art signal communication systems are unsuited for adoption in interactive video data systems that convey private point to point digital messages on a real time basis for large audiences.

Typical patents relating to nationwide communications employing such prior art telephone switching techniques are now briefly referenced as representative of the present state of the art utilizing analog (voice) telephone communication networks and cellular technology to accommodate low-cost mobile battery-operated subscriber units operable within local cellular subdivisions.

In the telephone arts: Freeburg, U.S. Pat. No. 4,481,670, Nov. 6, 1984 and U.S. Pat. No. 4,525,861, Jun. 25, 1985 and 4,550,443, Oct. 29, 1985 provide for handing off best signals from portable radio sets in two-way audio analog communications between overlapping zones served by different fixed location cellular transceivers, which in some cases use different frequency bands for isolating adjacent zones.

In the paging arts, modems are used for connection with a telephone system for communication and switching over a national network as typically set forth in Andros, et al. patents U.S. Pat. No. 4,870,410, Sep. 26, 1989 and U.S. Pat. No. 4,875,039, Oct. 17, 1989, and therefore are subject to the same switching system bottlenecks previously described even when short digital only communication is desired.

It is accordingly an objective of this invention to improve the state of the art by effectively using licensed interactive communication channels to provide substantially real time, synchronously timed digital communications of variable length between geographically separated base station subscribers of an interactive video data service system. Capacity for heavy audience participation without substantial delays during peak loading conditions is essential in a manner compatible with the FCC licensing conditions for interactive video data service.

It is a further objective of this invention to introduce into interactive video data service a system providing effective two-way interactive communications with simplified low-cost subscriber units transmitting in milliwatt peak power ranges under parameters compatible with FCC licensing restrictions.

Another object of the invention is to introduce portable digital communication subscriber units into an interactive video data service system adapted for local and national communications.

Other objects, features and advantages of the invention will be found throughout the following description, the drawings and the claims.

BRIEF DISCLOSURE OF THE INVENTION

A base station configuration for interactive data service provides several interrelated features for improving effectiveness of digital communication. Such features include (1) a system employing portable subscriber units of milliwatt transmitting power capacity, and (2) increasing substantially the number of subscriber units operable at the base station. Thus, typically 4000 subscriber units at a base station may be processed for point to point nationwide communication at 5.16 Kbaud data rate per unit.

A significant advantage of the invention is the capacity to rapidly connect a very large number of individually identified subscribers at each base station for parallel communications and connecting new subscribers into awaiting communication slots without significant delay.

In one embodiment the features of the present invention are embodied in a subscriber multiplexing system at the base station that relates synchronously with a base station carrier signal or the television frames of a master TV channel. Thus, the communications and switching connections are synchronized throughout a nationwide network for more efficiently and promptly processing point-to-point real time communications. Even more significant is the corresponding freedom to multiplex digital messages of variable length from a large number of transmitting subscriber units at the base station, with the assurance that little access waiting time will be encountered by subscribers to complete switching connections, even for nationwide communications.

The base station comprises a central transmitter and data processing site for processing transmitted digital data to subscriber units within the base station designated area. A plurality of receive only stations distributed throughout the region and connected by wire, cable, microwave link or radio to the central data processing site then process and relay transmitted digital data from subscriber units within subdivided zones in the base station designated area. Thus, the base station serves a gridwork of receiver sub-cell sites distributed at locations permitting reliable response by subscribers transmitting with milliwatt digit signal levels in the FCC authorized 218–219 MHz band. Provision is made to process fringe signals between the different subdivided zones so that low-cost portable battery-operated milliwatt transmitter subscriber units may be moved throughout the base station geographical area for reliably performing such functions as meter reading and data transfer.

The base station system is adapted for communication in a nationwide network of base stations over a satellite communication network such as that of U.S. Pat. No. 5,101,267. Thus, the base station data processor locally segregates, accumulates and formats the messages from individual subscribers for re-transmission over the satellite network to a switching hub and data processing center with the capacity to locate individual subscribers in remote base stations over a nationwide network.

Figure 1:
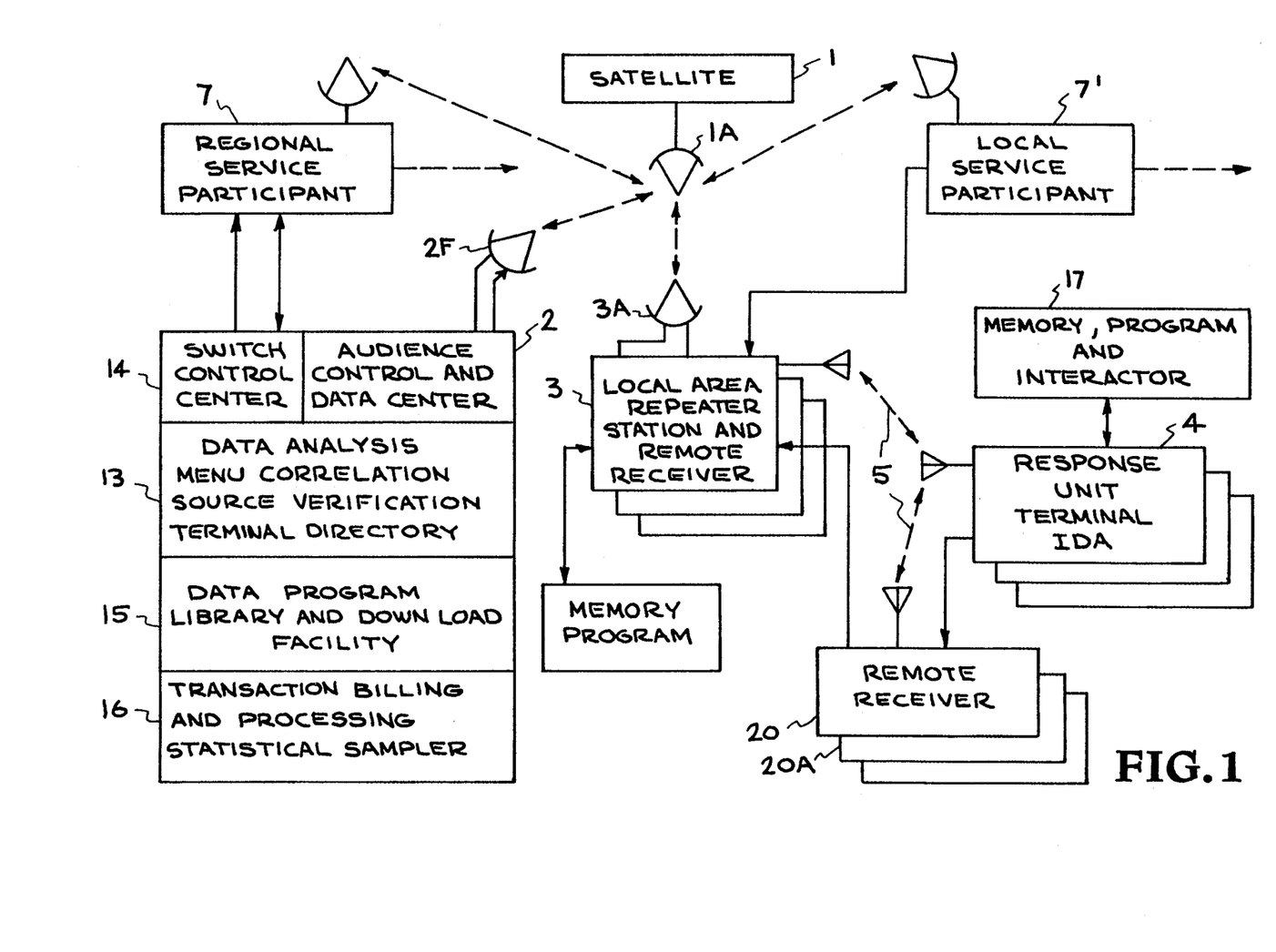
FIG. 1 is a block system diagram of a nationwide interactive video data satellite system embodiment of the invention that provides point-to-point communications between subscriber response units in local service areas and with various vendors of goods and services.

THE PREFERRED EMBODIMENTS:

In FIG. 1 the nationwide interactive network embodying this invention and setting out in perspective support services and equipment is illustrated in block diagram format. Thus a set of subscribers at response units 4 communicate over the wireless 218–219 MHz r-f links 5 to either a set of local remote receivers 20, each connected by a link 21 such as a telephone line to repeater cell 3, or to a local area base station repeater cell 3, one of a set of such repeater stations in different geographic locations for communicating via satellite 1 under control of a data and switching control center 2. Regional and local service or product participants 7 also communicate with the local area cells 3 and the control center 2. The basic operation of this system is set forth in said U.S. Pat. Nos. 4,591,906 and 5,101,267. Details of point-to-point switching and communication throughout the system identified at switch control center 14 and accompanying terminal directory 13, downloading of data and software from the control center 15, and the processing of billings and transactions 16, and the corresponding interaction of the memory and software at the subscriber unit 17 are set forth in co-pending applications Ser. No. 07/889,626, May 28, 1992 for Software Controlled Interactive Video Network and Ser. No. 07/932,241, Aug. 19, 1992 for Interactive Satellite Broadcast Network, which are incorporated hereinto by reference as background material to the extent necessary for providing a full disclosure of operating details.

In this system therefore, simplified low cost subscriber response units 4 are universally applicable to a wide range of interactive functions by means of software control facilities. The system furthermore in its r-f processing system efficiently handles mass data for accommodating very large system peak load capacity substantially in real time through the switch control center 14 with typically stores for each subscriber currently updated information that need not be transmitted with every transaction such as the directory identification code, name, address, telephone number and credit card, etc.

Figure 2:
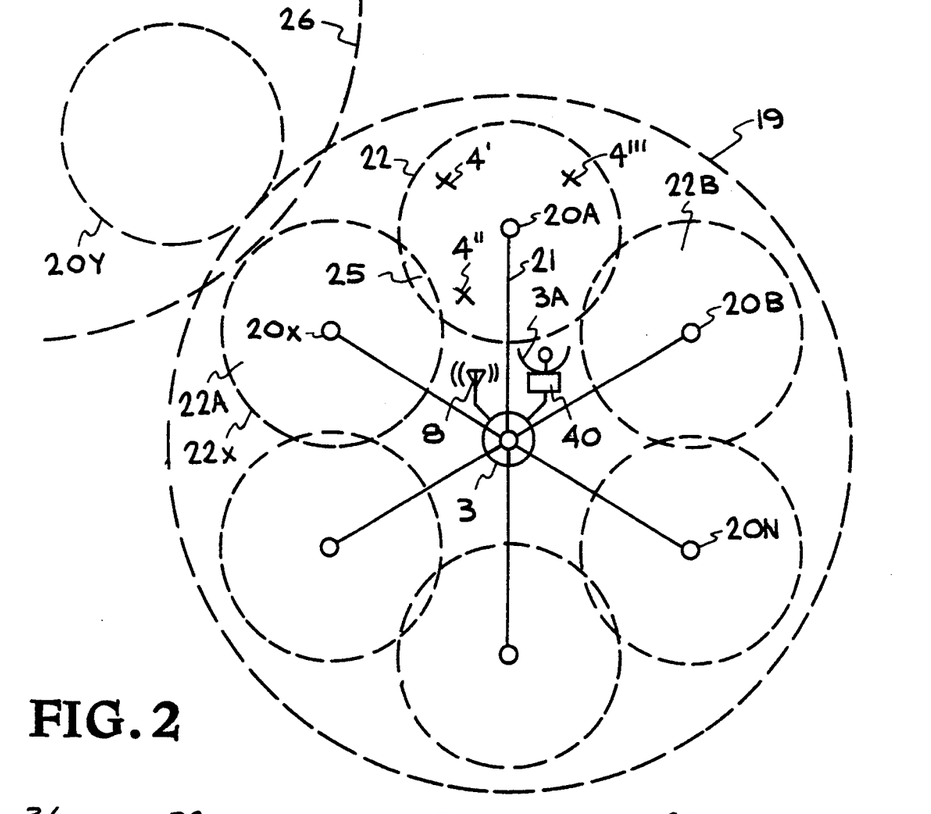
FIG. 2 is a diagrammatic view of a local area base cell site system embodiment of the invention for communications with very low powered local subscriber units, including mobile or portable units.

An explicit cell site 3 embodiment utilizing a local base station repeater cell 3 afforded by this invention, which expands the interactive capabilities and functions of the subscriber response units 4 while improving performance and reducing cost, is diagrammatically shown in FIG. 2. The outer dotted ring 19 outlines the limits of a local area cell site, such as may be licensed by the FCC for interactive video data service. The cell site embodiment utilizing local base station repeater cell 3 communicates with the satellite system via directed dish antenna 3A, and transmits digital communications and TV video overlay trigger signals to a set of subscribers X throughout the assigned territory by way of antenna 8.

A set of typically ten remote, receive-only, fixed-location relay stations 20A–20N are positioned at strategic locations within the cell area. Each local remote receiver station 20 is connected by cable, microwave or leased telephone line 21 to the cell site utilizing a local base station repeater cell 3 Thus, transceiving subscriber units X 4, 4', etc located within the subdivided response zones 22 communicate with the local remote receivers 20 over a significantly reduced transmission path distance within the subdivided response areas 22, as compared with direct transmission from a local base station repeater cell transceiving subscriber units X 4, 4'. This subdivision feature, accordingly for the first time in interactive video data system provides for reliable transmission at radiated power levels in the milliwatt region. Distinct advantages result including less chance for external interference and long life battery operated portable subscriber units 4 which can be moved throughout the cell territory (19).

Accordingly, this invention encourages such additional interactive services in the network as typified by meter reading, and inventory control in soft drink dispensing machines, etc. in a manner saving so much manpower and expense as to be viable economically in this type of interactive video data service system. In the latter two examples, very simple digital communication subscriber units 4 may be provided without the necessity for video displays, in the manner later described. Other examples are site alarms for remote monitoring of open doors, fires, failure, temperature, etc. Two-way paging services are also thus made available, or telemeter in location or condition of delivery trucks, etc. Furthermore, with full service video display TV installation at a subscriber station 4, the feasibility of moving such remote units to different locations in a house, office, or car is established. Accordingly this invention is in part directed to the provision of portable or mobile interactive subscriber stations and communication units for interactive video data service systems compatible with FCC standards. With the lower power transmitters provided, adjustments of power in the subscriber units may be avoided by simple AGC at the remote receiver terminals. Smaller and portable home units are also possible. There is considerable advantage of longer battery life for portable units.

Figure 3:
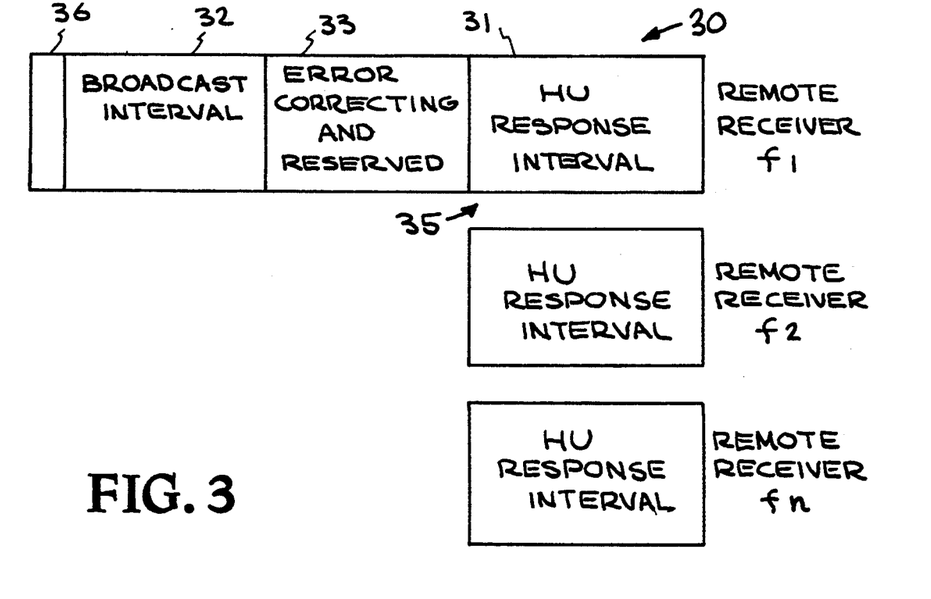
FIG. 3 is a fragmental sketch of r-f signal protocol at the base cell site for permitting communications from a significant number of subscriber units simultaneously in real time.

A further substantial advantage to the invention is the ability to handle point-to-point connections nationwide under peak traffic conditions with very little subscriber waiting time for access to the system. The system protocol for reception of messages and response at the subscriber units in the chart form of FIG. 3 illustrates the large number, typically 640, of subscribers X that can be simultaneously using the system at any cell site 5. With reference again to FIG. 2, thus assume that each of ten fixed remote receiver stations 20A–20N within the cell area (19) is capable of processing 64 on-air subscriber units X. This results because the milliwatt powered subscriber units X are adapted for transmission in a single one of the ten subdivided areas or zones 22, with provisions preventing interference with adjacent zones 22A, 22B, etc.

Other system advantages are: (1) that low power subscribers use the system at outer cell boundaries, thereby reducing chances for inter-cell interference, (2) that the expansion of the system may occur by adding subdivided zones as the subscriber base grows, (3) that the passive local remote receive-only receivers have no problems in meeting FCC interactive video data service conditions, (4) and that capital, power and operating costs substantially decrease.

With reference now FIG. 3, to transmit with ten subscriber units X in the respective zones 22 of FIG. 2, the protocol assigns in a timed broadcast period 30 a home unit (HU) response time interval 31, at an accumulated 5.1 kbaud response rate. Each of these switched-in user home units then transmits a digital message superimposed by modulation on the 218–219 MHz band subcarrier. The broadcast time interval 32 permits the cell site transmitter 8 of FIG. 2 to broadcast a message including a (ringing) signal that may include an address code number for activating a single home unit within the cell area 19 of FIG. 2. Each home unit has a built in address code that must be used to activate that unit 14 of FIG. 2, and the central data switch control unit maintains a directory of all such numbers in the nationwide network. The broadcast time interval 33 provides a time gap for checking errors and for providing desirable control signals. Guard gaps 36 are supplied between successive broadcast periods 30, also identifiable as r-f frames.

With reference again to FIG. 3, the r-f frames permit transmission at 5.1 kbaud for each of say ten subdivisions 22 of FIG. 2. Thus the cell stores in a buffer the ten multiplexed home unit data rates to load the buffer at a 51 kbaud rate. A total data rate for the main cell area 19 of FIG. 2 is 51 kbaud from the ten simultaneous responses from the separate subdivisions 22 of FIG. 2. Assuming no errors and 1000 bit messages from each home unit, with 3,000 home units trying to get their message through ten channels, the waiting time for a "line" would be less than one minute without contention, thereby minimizing the necessity of "redialing".

The legends in the right hand column show that each remote receiver station 20A-20N is assigned a corresponding communication frequency bandwidth $f_1$—$f_n$, thereby isolating the communications from subscriber units X in each subdivision 22 within the cell area 19 as shown in FIG. 2. The length of the r-f frames 30 is 12.4 milliseconds including a guard band 36 of about 120 microseconds.

Figure 4:
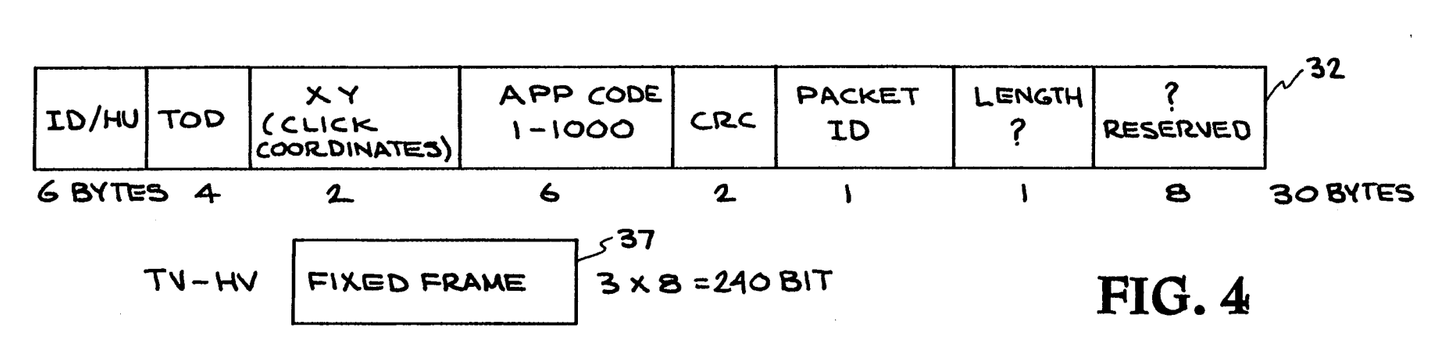
FIG. 4 is a diagrammatic sketch of message frames for illustrating the maximization of data processed at local cell sites.
Figure 5:
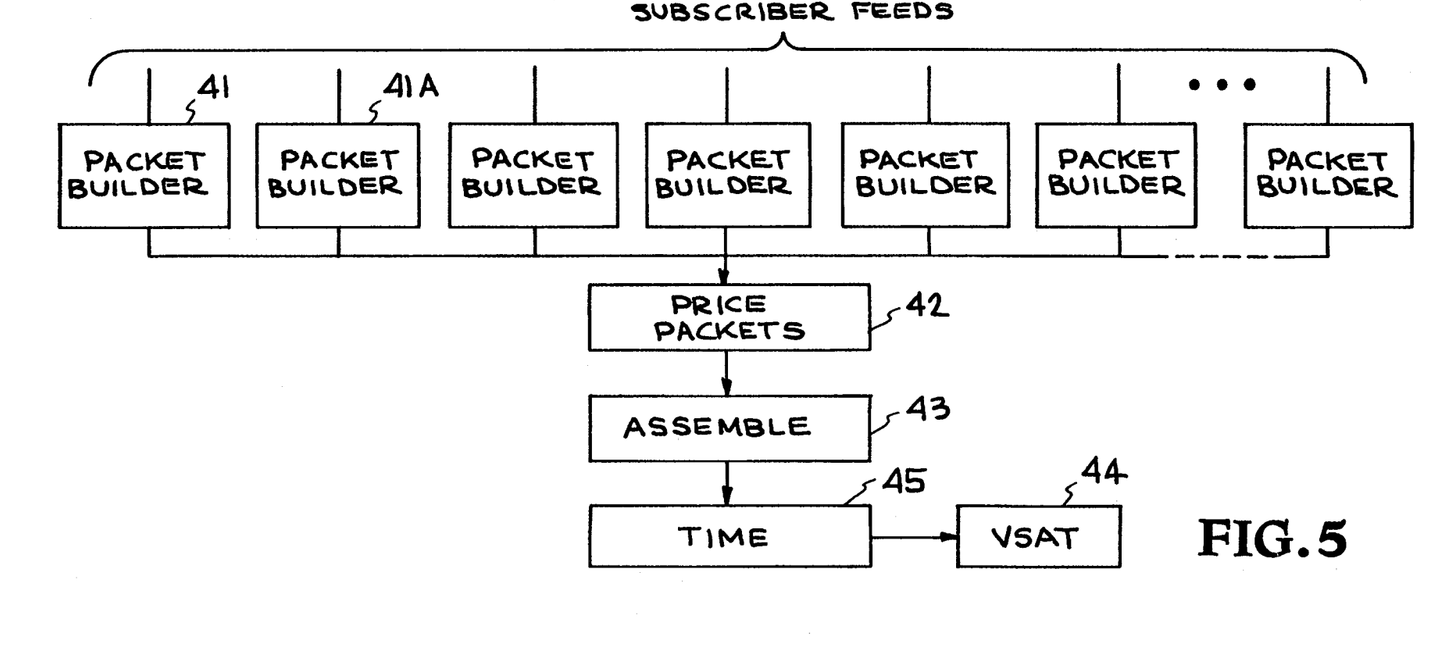
FIG. 5 is a block diagram of a base cell site to satellite communication link afforded by the invention to process fixed length frames and formulate variable length messages from subscribers during an active connection interval.

Typical message protocol is illustrated in FIG. 4 for fixed frame message lengths of 30 bytes of eight bits. This fixed length is important in minimizing access time to the system under peak load conditions, since there will be substantially no dead air time incurred while a subscriber is awaiting to be connected or disconnected. Various functional categories are typically included in the broadcast interval 32 as shown in the blocks. Of note is the home unit ID section which addresses the unit to be activated (similar to a telephone number), and the Packet ID byte for accumulating a sequence of home unit response frames into a packet. All messages and protocols are consistent with the transmission of data implicitly as part of a video message during the vertical blanking interval or transmission over a digital r-f link parallel to a video channel. However, as will be more particularly set forth later, it is pertinent to synchronize timed data within the nationwide system, even taking into account differences in travel time of radio waves (see U.S. Pat. No. 4,591,906), and for this reason the technique described in Pat. No. 4,755,871, Jul. 5, 1988 for Control of RF Answer Pulses in a TV Answer Back System may be used to synchronize transmissions with the TV carrier signal from the cell site transmitter and to organize all the multiplexed timing slots for avoiding idle on-air time. Thus, this system departs from any former telephone switching system art which is asynchronously switched.

As seen from FIGS. 1, 2, 4 and 5, the nationwide transmission of messages from the individual subscriber home units 4, (X) longer than 240 bits require several frames, with accumulation into packets, identifiable in the broadcast frame 32. The cell site transmission system 40 thus processes a set of packets in the manner shown in FIG. 5 to accumulate subscriber messages of variable length in a set of serial transmissions for transmitting to the satellite at higher transmission frequency. Accordingly packet builders 41, 41A, etc. are individually assigned to a responding one of simultaneously active subscribers until the subscriber's variable length message of n 240 bit frames is completed, and after pricing 42 the messages are accumulated 43, synchronously timed 45 and transmitted to the satellite 44. These accumulated messages are received at the central data station 2 for switching, adding pertinent subscriber data and a receiving address and retransmitting over the satellite at a receiving point, such as a further subscriber or a service provider.

Figure 6A:
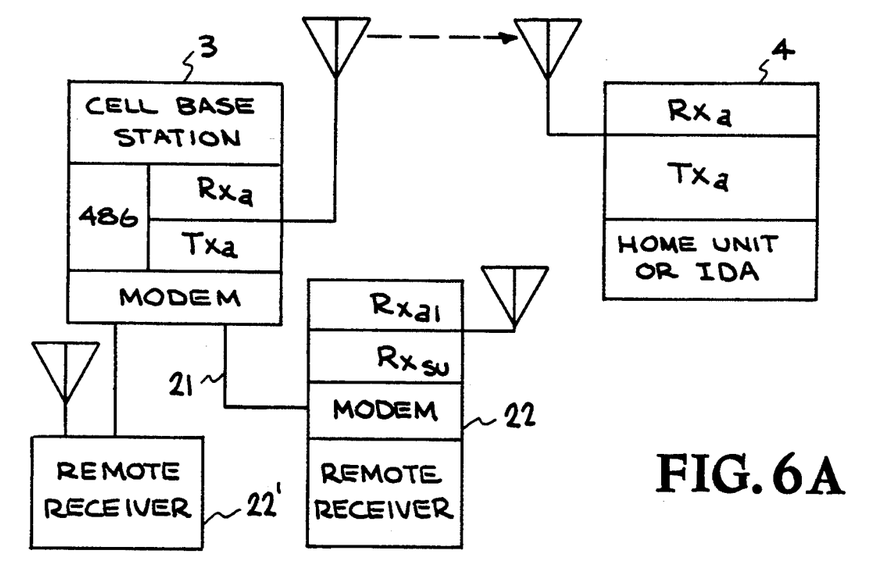
FIGS. 6A and 6B respectively are a block system diagram of communication channels at the base cell site, and a corresponding diagrammatic system flow diagram for transmitted messages between local subscribers the cell data center and the satellite connected network of cell sites.
Figure 6B:
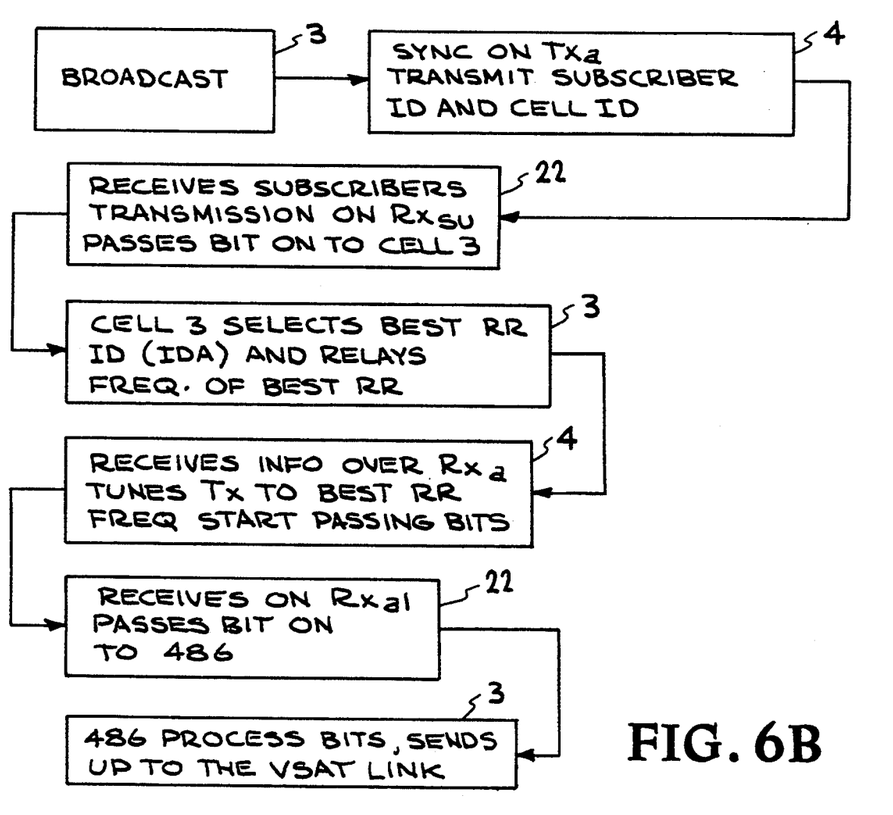

Now FIGS. 6A and 6B relate to the communication sequences within the local base station repeater cell area (19, FIG. 2) between home units 4, the cell site utilizing local base station repeater 3 and local remote stationary receivers 20A-20N Note that the home unit 4 is also designated as an interactive data appliance (IDA), a general term including subscriber video stations, digital alarms, or the like, and portable units.

The data flow chart of FIG. 6B relates to a "set-up" and response sequence of intercommunications between the respective subscriber units 4, (IDA) local remote fixed station subdivision receivers 20A-20N (RR) and the cell site utilizing local base station repeater cell 3. Synchronization is controlled by the carrier frequency $Tx_a$ of the cell transmitter upon which the subscriber unit 4 locks. Then the subscriber unit 4 initiates a response which includes both the subscriber ID and the cell ID for the purpose of handoff between cells with portable units or fringe area cells.

The remote receiver 20 receives the subscriber's transmission on its frequency $Rx_{su}$, and passes an acknowledgement to the base station repeater cell 3 for sampling transmission and auditing the transmission routing. Thus base station repeater cell 3 selects the local receiver remote 20A-20N, etc. that receives the best subscriber signal Note that the local remote receiver 20 receives both the transmissions from the cell transmitter frequency at $Rx_{al}$ and the communications at its assigned frequency $Rx_{su}$, and similarly the subscriber unit transmits on two alternative frequencies, one tuned to a particular remote receiver 20 frequency.

The base station repeater cell 3 then relays the best frequency back to the subscriber unit 4 for tuning in and finishing communications with the best and only remote receiver 20. This is the end of the "set up" period and the start of the transmission period, during which the message bits are relayed to the base station repeater cell 3 by the local remote receiver 20 tuned in, and are at the base station repeater cell 3 processed and relayed into the network to the central data hub via the VSAT link. Note that the gap 33 between the base station repeater cell 3 broadcast interval 32 and the home unit response interval 31 is used for the set up function so that a single frame period covers the procedure of FIG. 6B through the sending of a single frame of the message from the subscriber unit. If transmission conditions change, a succeeding frame of the subscriber's message thus could be transmitted from a different remote receiver at a different frequency. Thus the packet ID byte portion of FIG. 4 is significant for reassembling the message frames into a single message packet (also identified). The arbitrary cell identification number 486 is similar to a telephone exchange area code designation in the identification of the cell or the subscriber's complete ID address.

This set up procedure is important for "hand-off" of a portable unit from one stationary local remote receiver site 22 to another as fringe areas are encountered, such as at borders 25 between two local remote receiver 22 activity sites 22 (FIG. 2). Similarly the portable units can move from cell to cell when adjacent cells are present such as in urban areas, requiring similar hand-off procedure. The hand-off may be initiated in different ways.

As above described, the base station repeater cell 3 may initiate the hand-off of a subscriber 4 from a local remote receiver 20 in one zone to another in a different zone within the subdivided cell. Thus a signal strength (RSSI) measurement may serve as a criterion for hand-off, with the cell directing the subscriber into a set-up routine when signals below a threshold, −80dBm for example, are encountered. Since the subscriber unit 4 stores the message data, it is retained until the set-up procedure is completed in about 50 milliseconds.

Alternatively the subscriber unit software may cause the subscriber unit 4 to place itself in a set-up routine when the RSSI goes below a chosen threshold value, so that the home unit response is transmitted only after set-up with a satisfactory cell or cell sub-division zone (22) connection of proper signal strength.

When the subscribers 4 are transportable from cell to cell, the packets (FIG. 5) should be sorted at the data processing center 2 rather than at the base station repeater cell 3 level. Each packet carries an identification of the subscriber for this purpose and the packet ID is carried in the broadcast frame (FIG. 4) for such processing. Thus at the central hub (2) a packet of three frames could be derived from two different cells, generally adjacent in geographical relationship. Note the cell ID in the subscriber's transmissions (FIG. 6B), which is used for control purposes.

Also with reference to FIG. 2, the possibility of fringe hand off errors or interfering signals between cells is avoided by the allocation of different transmission frequencies for communicating with the geographically adjoining local remote receiver stations (20) in the adjacent base station repeater cell areas (19, 26). Thus, in the vicinity of overlapping base station repeater cell regions 19 and 26, the related frequencies $f_x$, $f_y$ assigned to adjacent local remote receivers 20X and 20Y may avoid interference problems between local remote receiver stations 20 in different adjacent base station repeater cell territories.

Figure 7A:
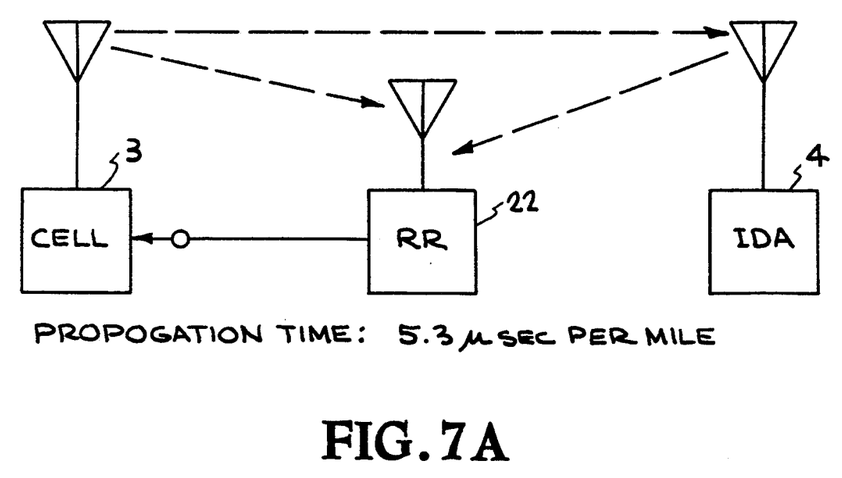
FIGS. 7A and 7B respectively are a block diagram illustrating transit time characteristics of messages at a base cell site, and a diagrammatic view of typical communication frames showing relative times at different cell site communication stations.
Figure 7B:
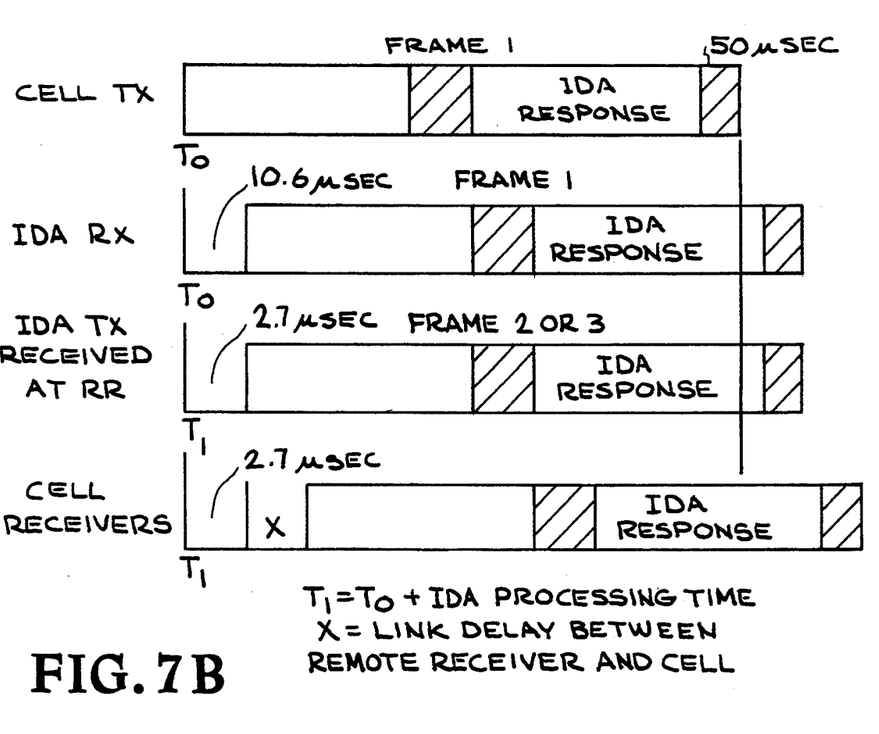

Critical timings in the messages processed within the base station repeater cell site (19, FIG. 2) are discussed in relationship to FIGS. 7A and 7B. For keeping the message bits accurately synchronized within the system, the delays in transit time of r-f transmissions must be accounted for. Those transit times are noted in FIG. 7A, and the transmitted message frame timings are set forth in FIG. 7B. The frames are sequentially separated by a 120 microsecond guard band. The approximate 2.7 microsecond delay within the cell area (19) of 2 miles diameter is encountered between the subscriber (IDA) 4 and the closest local remote receiver station 20 of approximately ten such stations distributed about the base station repeater cell. This is of no significance since by the use of fifty microsecond pulse widths in the communications that is less than 6% of the pulse width and thus no range adjustment is needed for that propagation induced delay. The base station repeater cell 3 thus adjusts its synchronization with system timing of the received IDA responses after accounting for the approximately two times 10.6 microsecond (average) delay time for the transmissions to IDA 4 and back to base station repeater cell 3.

Figure 8A:
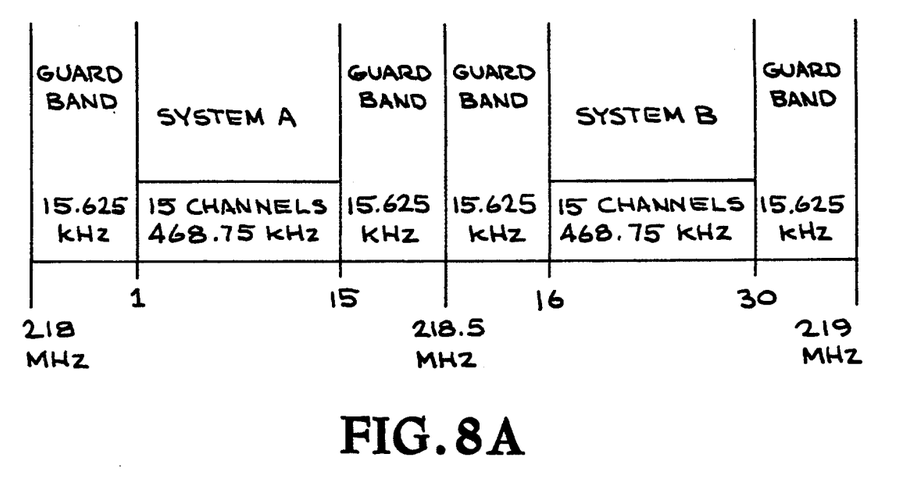
FIGS. 8A and 8B are respectively frequency band charts for FCC allocated frequency bands and subchannel bands for interactive video data services as employed by this invention.
Figure 8B:
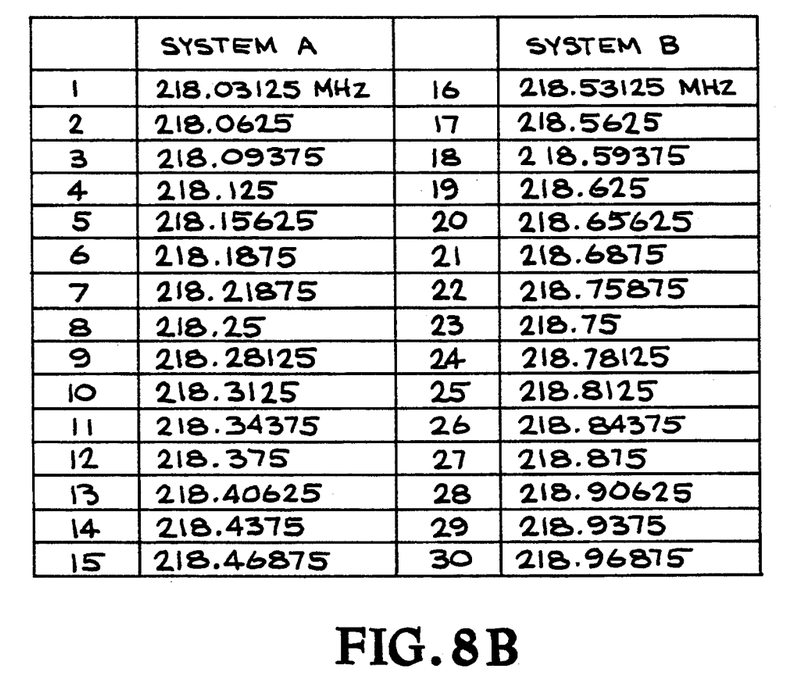

FIGS. 8A and 8B set forth the FCC approved bands for licensed interactive communications, thus allocating fifteen channels of bandwidth capable of carrying the messages under the conditions described herein.

Figure 9A:
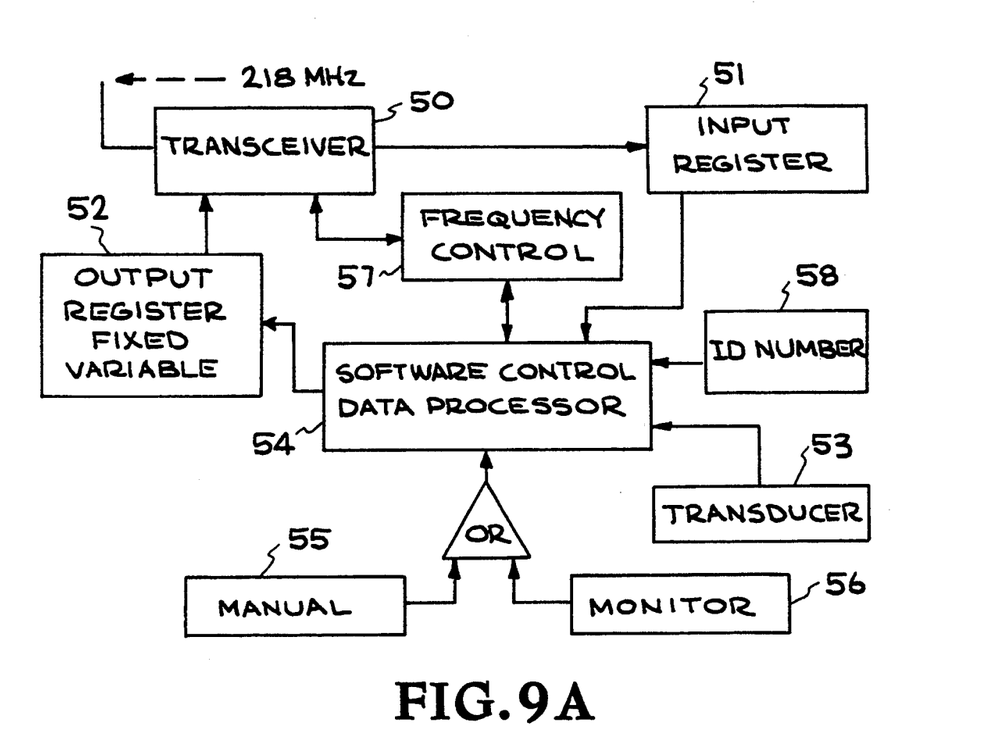
FIGS. 9A and 9B are respective block circuit diagrams of subscriber units for digital only fixed or mobile communication services and integrated video and digital data service embodiments of the invention.
Figure 9B:
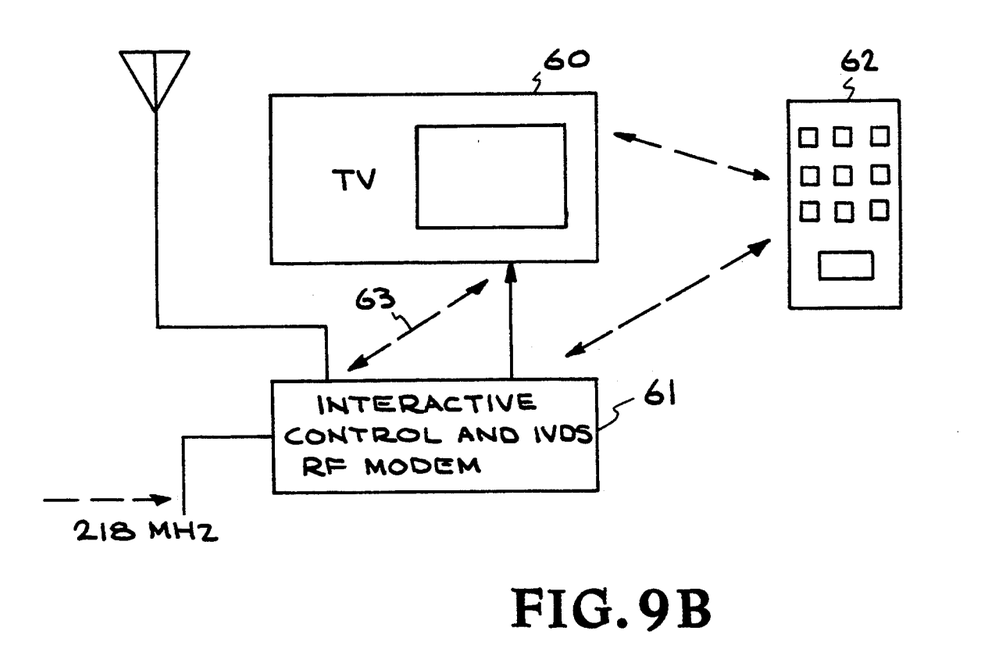

FIGS. 9A and 9B respectively illustrate portable subscriber units afforded by this invention for interactive two-way wireless communications in a cell compatible with FCC standards for interactive video data services of the simplified digital appliance type (9A) and the more comprehensive video display type (9B).

In the simplified version of FIG. 9A, the transceiver 50 permits two-way wireless communications in the 218–219 MHz bands set forth in FIG. 8, and compatible with the functions hereinbefore set forth such as in connection with FIG. 6A. The double headed arrow notation for the radiowaves at antenna 49 signifies two way wireless communication. For digital communications, an input register 51 for received digital data is supplied and an output register 52 for retaining interactive subscriber entered messages from transducer 53, typically a manual keyboard or a digital sensing instrument. Digital display means may be provided for subscriber viewing of either or both register contents. Thus the data processor 54, by way of suitable software controls the system with different modes of operation such as the manual control 55 suitable to keyboard input of data from a subscriber, or an automatic monitoring control mode 56 for relaying an alarm or inventory reading at a subscriber's coin operated vending machine. The frequency control section 57 serves to monitor and set the transmission carrier frequency during set up procedures for transmission to a most favorable fixed local remote receiver (20) station. Also it serves as the system clock to synchronize the transmission frequency of digital data pulses with the system by means of locking to a TV station carrier signal, for example. The unique identification number 58 is built into each subscriber unit and serves similar to a telephone number as a screen for incoming messages directed to that subscriber unit and as an identification of the source of messages sent from an individual subscriber. General software control technology for operation of the subscriber units and systems of the disclosed system are known in the art as set forth in more detail in the before mentioned prior patents and patent applications.

This interactive data appliance embodiment of the invention provides a number of innovative features and significant advantages, all compatible with operations within the parameters of a nationwide network of FCC licensed local interactive video data service cells, either for interactive communication within the local cell or for interactive communications nationwide over the network. The software controlled data processor makes the utility of the appliance substantially universal in terms of introduction of modes of operation to match with and integrate into machinery or systems and to provide a variety of features for manual control of interactivity by a subscriber. The simplicity of the digital mode of communication makes the unit simple, low cost and small in size for ideal portability and long life from battery power. It is of major importance to have the ability in an interactive video data service installation for portable movement of a subscriber unit for providing communication capabilities formerly limited to nationwide mobile telephone systems and further providing a range of interactivities not hitherto feasible.

The embodiment of FIG. 9B provides for interactivity in conjunction with video displays, and in particular as related to broadcast television programs. Thus the conventional television receiver 60 with the wireless communication link 63 communicates with the interactive data appliance 61 for the type of service described in U.S. Pat. No. 5,101,267, for example. Therefore the manual control unit 62 controls the TV receiver 60 and the interactive data appliance, which in this case may be termed a home unit or subscriber station. The portability feature made possible by this invention permits such a unit to be moved next door or put into a car or van for movement within or across cell boundaries with good digital synchronous communication contact within the nationwide network of cells, which utility has not heretofore been known or feasible in interactive video data systems.

It is therefore evident from this disclosure that the state of the art is advanced. Accordingly the features of novelty believed descriptive of the spirit and nature of the invention are set forth with particularity in the following claims.

I claim:

1. A base station configuration in a two-way communication interactive video network having a network hub switching center for routing communications from and to a plurality of subscriber units at various geographic locations served by a base station that processes digital data modulated on an r-f carrier and transmitted from a plurality of subscriber units dispersed over a predetermined base station geographic area by presenting multiplexed digital data synchronously related to the base station broadcast signal for communication from identified individual subscriber units within designated geographic service areas, comprising in combination, base station data processing and transmission facilities for transmitting to a set of local subscriber units and receiving from a subset of those local subscriber units multiplexed synchronously related digital data messages of variable lengths for point-to-point communication between individual subscribers with remotely located reception stations, base station reception means for receiving and processing data messages from the set of local subscriber units at that base station comprising a set of cell subdivision sites partitioned from said base station geographic area and dispersed over the base station geographic area, each cell subdivision site being adapted for receiving-only low power digital messages transmitted from local subscriber units within range of the partitioned cell site areas, and a set of local subscriber transceiver units including low power mobile units located within the base station geographic area each adapted to communicate with said base station by way of digital data signals of variable lengths synchronously related to said base station broadcast signal and timed for said multiplexed message transmission.

2. The base station configuration defined in claim 1 wherein said hub switching center is located remotely from said base station, and said network comprises a plurality of base stations located in different geographic areas, further comprising, data processing facilities in said base station and network for communicating designated digital data messages between local subscriber units in said predetermined base station geographic area and other subscriber units located in the vicinity of the base stations located in different geographic areas via said hub switching center.

3. The configuration of claim 2 further comprising, message accumulation means in said base station data processing facilities operative to store and retransmit digital message packets from identified subscriber units comprising a sequence of subscriber transmission frames, and processing means for retransmission of the digital message packets to the hub switching center by satellite.

4. The configuration of claim 2 further comprising, subscriber unit management and transmission means for conveying messages from the base station to the hub switching center which processes a subscriber message data bit output from the base station at 2.560 kbaud.

5. The configuration of claim 4 further comprising a set of n isolated said cell sites, and assembling means for accumulating the messages from said n cell sites and transmitting the accumulated messages over said transmission means at a message data bit capacity of n times 2.560 kbaud.

6. The configuration of claim 5 further comprising means for interlacing 64 subscriber units for transmitting simultaneously multiplexed messages at said base station.

7. The configuration of claim 5 further comprising means for transmitting bit data rate at 5.16 kbaud from the home units to the assembling means.

8. The configuration of claim 2 further comprising means for transmitting messages from the different subdivided cell areas on different carrier frequencies.

9. The base station configuration defined in claim 1 further comprising, means in said base unit for compensating for the time of propagation of messages between the different individual subscriber units and the base station data processing facilities.

10. The base station configuration defined in claim 1 further comprising a transmitter for conveying messages from said base station to said subscriber units on a carrier frequency of substantially 218 MHz.

11. The base station configuration defined in claim 1 wherein each of said local subscriber units is individually identified by reception and transmission of digital signal pulses in a predetermined timing relationship synchronized with a television frame of said television broadcast signal.

12. The base station configuration in claim 1 wherein said local subscriber units comprise digital message organization means that disassembles a variable length digital message for transmission on a sequence of fixed length transmission frames.

13. The base station configuration in claim 1 further comprising receive only stations in said cell subdivision sites, and means for operating the base station and subscriber units to hand-off a communication message for transmission over a path through a single one of said cell subdivision receive-only stations.

14. The base station configuration in claim 13 further comprising subscriber units operable to transmit on a plurality of frequency bands, and receive-only receivers at different subdivision sites operable in different ones of said frequency bands.

15. The base station configuration in claim 13 which comprises one of a plurality of base stations in said network, further comprising facilities for handing off communications from a subscriber unit within the base station geographic area for communication through a network path of a different base station.

16. A point-to-point interactive video network system having a central switching station, a plurality of base stations, a satellite station, and a set of subscriber units located in the vicinity of each base unit, comprising in combination, means for providing for two-way digital communications between two different subscriber units by a serial communication path extending through a base station, the satellite, the central station, the satellite and back to a base station, wherein at least some of said base stations serve a set of subscriber units dispersed over a predetermined geographic area and comprise communication means between the subscriber units with the base station including a set of stationary receive only terminals remote from the base station coupled by a communication link with the base station for conveying transmitted messages from subscriber units in a subdivided portion of said geographic area in the vicinity of the receive only terminals to the base station, subscriber transmitter units for transmitting digital amplitude modulated pulses at a peak power in the milliwatt range, and data processing means at the base station for assembling and re-transmitting digital subscriber messages from the subscriber units via the satellite to the central station, said subscriber units transmitting on a plurality of frequency bands.

17. A point-to-point interactive video network system having a central switching station, a plurality of base stations, a satellite station, and a set of subscriber units located in the vicinity of each base unit, comprising in combination, means for providing for two-way digital communications between two different subscriber units by a serial communication path extending through a base station, the satellite, the central station, the satellite and back to a base station, wherein at least some of said base stations serve a set of subscriber units dispersed over a predetermined geographic area and comprise communication means between the subscriber units with the base station including a set of stationary receive only terminals remote from the base station coupled by a communication link with the base station for conveying transmitted messages from subscriber units in a subdivided portion of said geographic area in the vicinity of the receive only terminals to the base station, subscriber transmitter units for transmitting digital amplitude modulated pulses at a peak power in the milliwatt range, and data processing means at the base station for assembling and re-transmitting digital subscriber messages from the subscriber units via the satellite to the central station, said subscriber units being portable, said base station including means to receive messages from said subscriber units through a single one of said receive only terminals.

18. A point-to-point interactive video network system having a central switching station, a plurality of base stations, a satellite station, and a set of subscriber units located in the vicinity of each base unit, comprising in combination, means for providing for two-way digital communications between two different subscriber units by a serial communication path extending through a base station, the satellite, the central station, the satellite and back to a base station, wherein at least some of said base stations serve a set of subscriber units dispersed over a predetermined geographic area and comprise communication means between the subscriber units with the base station including a set of stationary receive only terminals remote from the base station coupled by a communication link with the base station for conveying transmitted messages from subscriber units in a subdivided portion of said geographic area in the vicinity of the receive only terminals to the base station, subscriber transmitter units for transmitting digital amplitude modulated pulses at a peak power in the milliwatt range, and data processing means at the base station for assembling and re-transmitting digital subscriber messages from the subscriber units via the satellite to the central station, each of the receive only terminals receiving signals in a different frequency band, and the subscriber units having means for selecting a transmission carrier frequency in a plurality of the frequency bands.

19. An interactive video data system comprising:
subscribers with portable subscriber units and facilities for communicating from the subscriber units when moved through different geographic zones, and
a set of subscriber units limited to digital processing facilities comprising digital transducers and means for transmitting digital data derived by said transducers.

20. An interactive video data system comprising:
subscribers with portable subscriber units and facilities for communicating from the subscriber units when moved through different geographic zones,
a base station of defined geographic area for serving a set of said subscriber units, said area is subdivided into a plurality of zones, and receive only stations located in said zones for reception of transmissions from subscriber units located in the respective zones, and
facilities in said base station and subscriber units for handing off communications between zones when communicated signals deteriorate below a given threshold.

* * * * *

UNITED STATES PATENT AND TRADEMARK OFFICE
CERTIFICATE OF CORRECTION

PATENT NO.        : 5,388,101
APPLICATION NO. : 07/966414
DATED             : February 7, 1995
INVENTOR(S)       : Gilbert M. Dinkins It is certified that error appears in the above-identified patent and that said Letters Patent is hereby corrected as shown below:

Column 12, Line 45. In claim 11, delete "said television" and insert --said base station--.

Signed and Sealed this

Twenty-second Day of December, 2009

David J. Kappos
*Director of the United States Patent and Trademark Office*

(12) EX PARTE REEXAMINATION CERTIFICATE (8797th)
United States Patent
Dinkins (10) Number: US 5,388,101 C1
(45) Certificate Issued: Jan. 17, 2012

(54) INTERACTIVE NATIONWIDE DATA SERVICE COMMUNICATION SYSTEM FOR STATIONARY AND MOBILE BATTERY OPERATED SUBSCRIBER UNITS

(75) Inventor: Gilbert M. Dinkins, Herdon, VA (US)

(73) Assignee: Eon Corporation, Reston, VA (US)

Reexamination Request:
No. 90/011,264, Oct. 6, 2010

Reexamination Certificate for:
Patent No.: 5,388,101
Issued: Feb. 7, 1995
Appl. No.: 07/966,414
Filed: Oct. 26, 1992

Certificate of Correction issued Dec. 22, 2009.

(51) Int. Cl.
*H04B 7/185* (2006.01)
*H04H 9/00* (2006.01)
*H04H 3/00* (2006.01)
*H04N 7/173* (2006.01)
*H04N 7/24* (2006.01)
*H04Q 7/12* (2006.01)
*H04Q 7/14* (2006.01)

(52) U.S. Cl. ........................ 725/62; 348/E7.07; 370/316; 370/328; 375/E7.025; 455/420; 455/428; 455/436; 455/454; 455/507; 455/560; 725/119; 725/65

(58) Field of Classification Search ................... 370/95.1
See application file for complete search history.

(56) References Cited

To view the complete listing of prior art documents cited during the proceeding for Reexamination Control Number 90/011,264, please refer to the USPTO's public Patent Application Information Retrieval (PAIR) system under the Display References tab.

*Primary Examiner* — Ovidio Escalante (57) ABSTRACT

In a two-way interactive communication video network having a network switching center for point-to-point communications between subscribers at different geographic locations, a local base station configuration is provided for facilitating low power battery operated portable subscriber units. The local subscriber units surrounding a base station are adapted for multiplex transmission of digital messages synchronously related to a broadcast television signal for system coordination. Digital messages are transmitted from the local subscriber units to the base station data processing facility through a set of receive only cell site subdivision zones distributed over the base station transmitter geographical range, which communicate with the base stations data processing facility over a communication link such as wired cable. Messages are compiled and relayed by satellite to a network switching center transmitter site for nationwide point-to-point communications. Small-size, inexpensive, low-power, portable, digital-transmitting subscriber units are introduced compatible with interactive video data system standards with the ability to cross subdivision and cell zones. Thus, monitoring of inventory, temperature, and other parameters for passive automatic alarm systems and the like, as well as active mobility of subscriber units for meter reading and the like is made possible with direct low-cost nationwide real time reporting capability.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 2, 4-6, 8 and 12 is confirmed.

Claims 3, 7, 9-11 and 13-20 were not reexamined.

* * * * *

(12) EX PARTE REEXAMINATION CERTIFICATE (9205th)
United States Patent
Dinkins (10) Number: US 5,388,101 C2
(45) Certificate Issued: Aug. 14, 2012

(54) INTERACTIVE NATIONWIDE DATA SERVICE COMMUNICATION SYSTEM FOR STATIONARY AND MOBILE BATTERY OPERATED SUBSCRIBER UNITS

(75) Inventor: Gilbert M. Dinkins, Herdon, VA (US)

(73) Assignee: Eon Corporation, Reston, VA (US)

Reexamination Request:
No. 90/010,383, Jan. 9, 2009

Reexamination Certificate for:
Patent No.: 5,388,101
Issued: Feb. 7, 1995
Appl. No.: 07/966,414
Filed: Oct. 26, 1992

Reexamination Certificate C1 5,388,101 issued Jan. 17, 2012

Certificate of Correction issued Dec. 22, 2009.

(51) Int. Cl.
*H04B 7/185* (2006.01)
*H04N 7/173* (2006.01)
*H04N 7/24* (2006.01)

(52) U.S. Cl. ...................... 725/62; 348/E7.07; 370/316; 370/328; 375/E7.025; 455/428; 455/436; 455/454; 455/507; 455/560; 725/65

(58) Field of Classification Search ........................... None
See application file for complete search history.

(56) References Cited

To view the complete listing of prior art documents cited during the proceeding for Reexamination Control Number 90/010,383, please refer to the USPTO's public Patent Application Information Retrieval (PAIR) system under the Display References tab.

*Primary Examiner* — Roland Foster (57) ABSTRACT

In a two-way interactive communication video network having a network switching center for point-to-point communications between subscribers at different geographic locations, a local base station configuration is provided for facilitating low power battery operated portable subscriber units. The local subscriber units surrounding a base station are adapted for multiplex transmission of digital messages synchronously related to a broadcast television signal for system coordination. Digital messages are tansmitted from the local subscriber units to the base station data processing facility through a set of receive only cell site subdivision zones distributed over the base station transmitter geographical range, which communicate with the base stations data processing facility over a communication link such as wired cable. Messages are compiled and relayed by satellite to a network switching center transmitter site for nationwide point-to-point communications. Small-size, inexpensive, low-power, portable, digital-transmitting subscriber units are introduced compatible with interactive video data system standards with the ability to cross subdivision and cell zones. Thus, monitoring of inventory, temperature, and other parameters for passive automatic alarm systems and the like, as well as active mobility of subscriber units for meter reading and the like is made possible with direct low-cost nationwide real time reporting capability.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *